(12) United States Patent
Chen

(10) Patent No.: US 10,795,781 B2
(45) Date of Patent: *Oct. 6, 2020

(54) RECREATING A COMPUTING ENVIRONMENT USING TAGS AND SNAPSHOTS

(71) Applicant: Red Hat, Inc., Raleigh, NC (US)

(72) Inventor: Huamin Chen, Westborough, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/246,767

(22) Filed: Jan. 14, 2019

(65) Prior Publication Data

US 2019/0146885 A1    May 16, 2019

Related U.S. Application Data

(63) Continuation of application No. 14/942,938, filed on Nov. 16, 2015, now Pat. No. 10,180,886.

(51) Int. Cl.
*G06F 11/14* (2006.01)
*G06F 16/27* (2019.01)

(52) U.S. Cl.
CPC ...... *G06F 11/1469* (2013.01); *G06F 11/1438* (2013.01); *G06F 11/1446* (2013.01); *G06F 16/27* (2019.01); *G06F 2201/80* (2013.01); *G06F 2201/84* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,805,095 A | * | 2/1989 | Armstrong ............ | G06F 11/141 714/15 |
| 5,230,047 A | * | 7/1993 | Frey, Jr. .................. | G06F 16/13 714/4.1 |
| 5,481,694 A | | 1/1996 | Chao et al. | |
| 5,713,024 A | | 1/1998 | Halladay | |
| 5,841,694 A | * | 11/1998 | Wong .................... | G11C 7/1006 365/185.05 |
| 6,578,069 B1 | * | 6/2003 | Hopmann ............. | G06F 16/955 709/203 |
| 7,038,805 B1 | * | 5/2006 | Wegener ............... | G06F 40/174 358/1.16 |

(Continued)

OTHER PUBLICATIONS

USPTO, Office Action for U.S. Appl. No. 14/942,938, dated Jun. 28, 2017.

(Continued)

*Primary Examiner* — Amine Riad
(74) *Attorney, Agent, or Firm* — Lowenstein Sandler LLP

(57) ABSTRACT

A processing device receives a request to recreate an application from a particular point in time. The processing device determines a set of hierarchical tags in a data store of hierarchical tags, the set of hierarchical tags describes a computing environment hosting the application from the particular point in time. The processing device copies, from the data store, a snapshot associated with a source data tag of the set of hierarchical tags. The processing device recreates the computing environment hosting the application from the particular point in time in a replication environment using the set of hierarchical tags and the snapshot.

20 Claims, 7 Drawing Sheets

(56) References Cited

U.S. PATENT DOCUMENTS

| | | | |
|---|---|---|---|
| 7,127,535 B1* | 10/2006 | Huebsch | G06F 11/1456 710/52 |
| 7,254,682 B1 | 8/2007 | Arbon | |
| 7,568,080 B2 | 7/2009 | Prahlad et al. | |
| 7,765,195 B2 | 7/2010 | Miller et al. | |
| 7,873,806 B2 | 1/2011 | Prahlad et al. | |
| 7,882,069 B2* | 2/2011 | Glover | G06F 11/1451 707/640 |
| 8,117,163 B2* | 2/2012 | Brown | G06F 11/1458 707/610 |
| 8,140,794 B2 | 3/2012 | Prahlad et al. | |
| 8,145,673 B2 | 3/2012 | Bloesch et al. | |
| 8,271,974 B2 | 9/2012 | Mazhar et al. | |
| 8,321,377 B2 | 11/2012 | Michael et al. | |
| 8,321,852 B2 | 11/2012 | Shenfield | |
| 8,433,872 B2 | 4/2013 | Prahlad et al. | |
| 8,595,191 B2* | 11/2013 | Prahlad | G06F 9/4856 707/654 |
| 8,738,870 B1* | 5/2014 | Balasubramanian | G06F 12/16 711/161 |
| 8,813,065 B2 | 8/2014 | Zygmuntowicz et al. | |
| 8,886,609 B2 | 11/2014 | Buragohain et al. | |
| 8,898,411 B2 | 11/2014 | Prahlad et al. | |
| 8,909,990 B2 | 12/2014 | Davis et al. | |
| 8,914,397 B2* | 12/2014 | Milic-Frayling | G06F 16/48 707/767 |
| 8,935,208 B2* | 1/2015 | Brown | G06F 11/1458 707/610 |
| 8,954,663 B1 | 2/2015 | Klein et al. | |
| 9,558,077 B1* | 1/2017 | Berger | G06F 11/1469 |
| 9,569,310 B2 | 2/2017 | Raj et al. | |
| 9,588,704 B2* | 3/2017 | Mutha | G06F 3/0689 |
| 9,639,426 B2* | 5/2017 | Pawar | G06F 16/128 |
| 9,892,123 B2* | 2/2018 | Kottomtharayil | G06F 11/1458 |
| 2002/0083362 A1* | 6/2002 | Semo | G06F 9/4416 714/4.11 |
| 2004/0220939 A1* | 11/2004 | Miller | G06F 11/1435 |
| 2004/0250033 A1 | 12/2004 | Prahlad et al. | |
| 2007/0094310 A1 | 4/2007 | Passey et al. | |
| 2009/0210458 A1 | 8/2009 | Glover et al. | |
| 2009/0307449 A1 | 12/2009 | Prahlad et al. | |
| 2010/0070726 A1 | 3/2010 | Ngo et al. | |
| 2010/0070860 A1 | 3/2010 | Alkov et al. | |
| 2010/0145933 A1 | 6/2010 | Consul et al. | |
| 2010/0205348 A1* | 8/2010 | Moshayedi | G11C 14/0018 711/102 |
| 2010/0318497 A1* | 12/2010 | Price | G06F 16/2272 707/674 |
| 2011/0131187 A1 | 6/2011 | Prahlad et al. | |
| 2011/0246416 A1 | 10/2011 | Prahlad et al. | |
| 2012/0179886 A1 | 7/2012 | Prahlad et al. | |
| 2013/0013573 A1 | 1/2013 | Anglin | |
| 2013/0238872 A1 | 9/2013 | Prahlad et al. | |
| 2014/0181027 A1* | 6/2014 | Whitehead | G06F 11/14 707/639 |
| 2015/0046418 A1 | 2/2015 | Akbacak et al. | |
| 2015/0100952 A1 | 4/2015 | Tornow et al. | |
| 2015/0212894 A1* | 7/2015 | Pawar | G06F 11/1469 707/679 |
| 2015/0212895 A1* | 7/2015 | Pawar | G06F 11/1451 707/649 |
| 2017/0090688 A1 | 3/2017 | Anderson et al. | |
| 2018/0011765 A1* | 1/2018 | Bradbury | G06F 11/3037 |

OTHER PUBLICATIONS

USPTO, Final Office Action for U.S. Appl. No. 14/942,938, dated Nov. 14, 2017.
USPTO, Office Action for U.S. Appl. No. 14/942,938, dated Apr. 13, 2018.
USPTO, Notice of Allowance for U.S. Appl. No. 14/942,938, dated Sep. 7, 2018.
Johnston, "DevOps and the Software-Defined Data Center: How to Get There from Here", <puppetlabs.com/blog/devops-and-software-defined-data-center>, published on Sep. 26, 2013, 2 pages.
Preimesberger, "HashiCorp Unveils DevOps Data Center Automation Toolset", <www.eweek.com/enterprise-apps/hashicorp-unveils-devops-data-center-automation-toolsethtml>, published on Jul. 13, 2015, 7 pages.
Haswell, Introducing Flocker 0.1, a Lightweight Volume & Container Manager for Docker, <clusterhq.com/2014/08/13/introducing-flocker/>, published on Aug. 13, 2014, 4 pages.
Ferranti et al., "Backing up Data-Only Containers", <groups_google.com/forum/#!topic/docker-user/5aPGflaoy_O, published on 2014>, retrieved on Jul. 27, 2015, 5 pages.

* cited by examiner

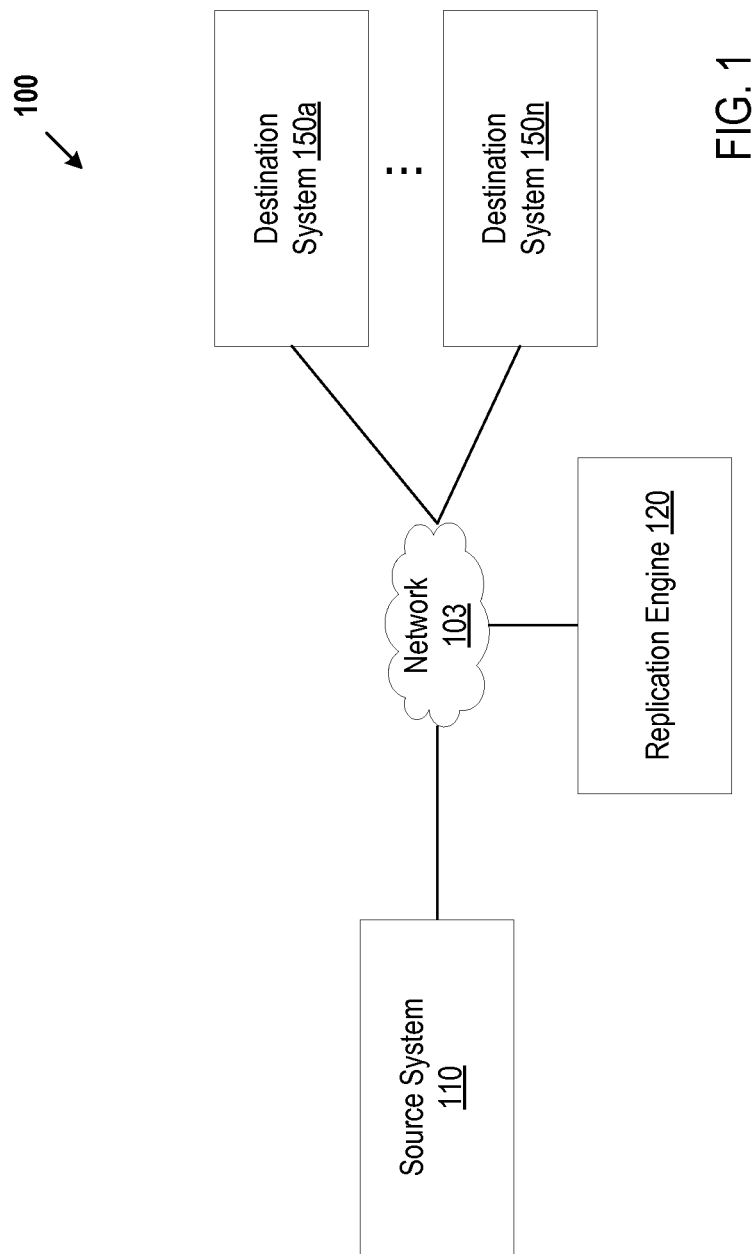

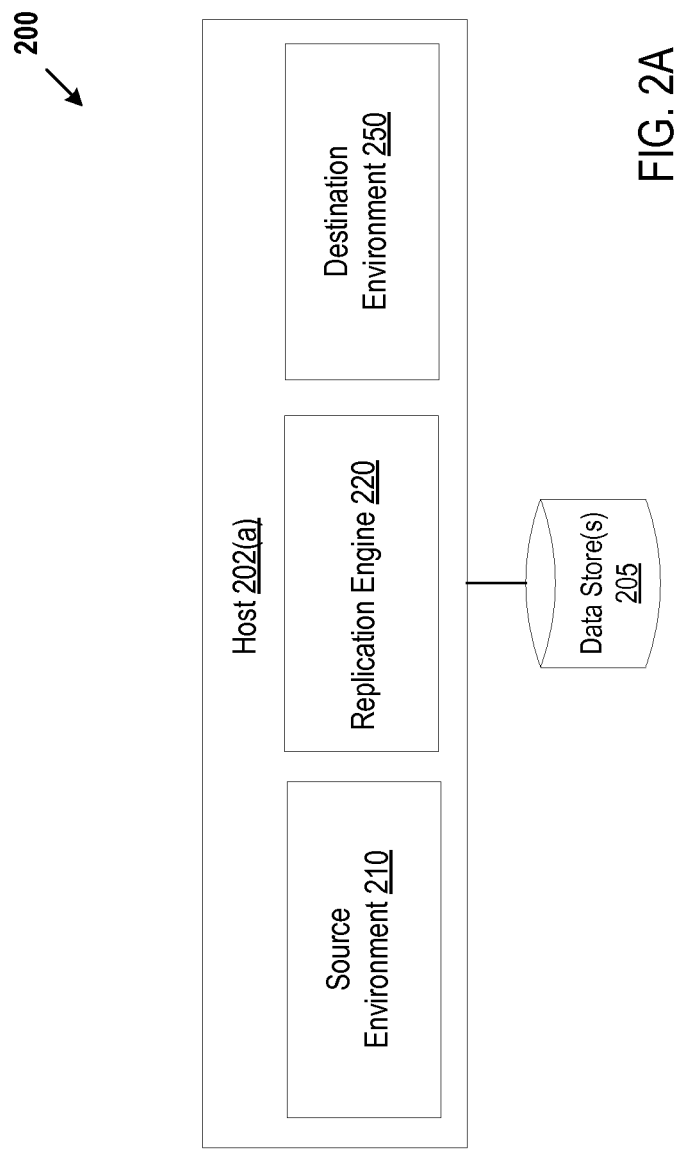

RECREATING A COMPUTING ENVIRONMENT USING TAGS AND SNAPSHOTS

REFERENCE TO RELATED APPLICATION

This application is a continuation of and claims the benefit under 35 U.S.C. § 102 of U.S. patent application Ser. No. 14/942,938, filed Nov. 16, 2015, the entirety of which is incorporated herein by reference.

TECHNICAL FIELD

The present disclosure relates to recreating a computing environment, and more specifically, relates to using tags and snapshots to recreate a computing environment.

BACKGROUND

In software development, multiple computing environments are generally created for testing, deployment, integration, diagnostics, and maintenance services that imitate a main production environment. However, recreating a production environment during application life cycle management can be labor intensive and difficult to maintain. Conventionally, recreated environments lack direct unfettered access to data of the production environment due to issues related to overhead, stability, security, data protection, and/or data privacy. For example, staging environments are traditionally employed to distribute changes made in the production environment. However, staging environments cause stale data that restrict a developer's ability to rollback changes, recreate bugs, and provide just-in-time fixes.

Increasingly, computing environments are hosted using distributed computing in a data center or integrated with cloud computing on an array of different computing devices. Distributed computing is the use of computing resources (hardware and software) that are delivered as a service over a network (typically the Internet), often referred to as "cloud computing." Cloud computing can generally include an interface that a user can use to manage associated resources such as processors, storage, network services, etc. For example, Platform-as-a-Service (PaaS) offerings facilitate deployment of applications on different computing devices or platforms using templates. Traditionally, templates lack specific changes made in the production environment during application development. Commonly, applications and application data are managed by separate information silos. Because of the increasing dependencies on accurate data, application downtime and data-inaccessibility of any kind can be costly. Accordingly, traditional data management systems lack end-to-end application environment management that include application awareness to recreate computing environments without stopping and restarting an entire software application.

BRIEF DESCRIPTION OF THE DRAWINGS

The present disclosure will be understood more fully from the detailed description given below and from the accompanying drawings of various implementations of the disclosure.

FIG. 1 illustrates an example system architecture for various implementations of the disclosure.

FIGS. 2A-B are example system architectures for various implementations of the disclosure.

DETAILED DESCRIPTION

Figure 2B:
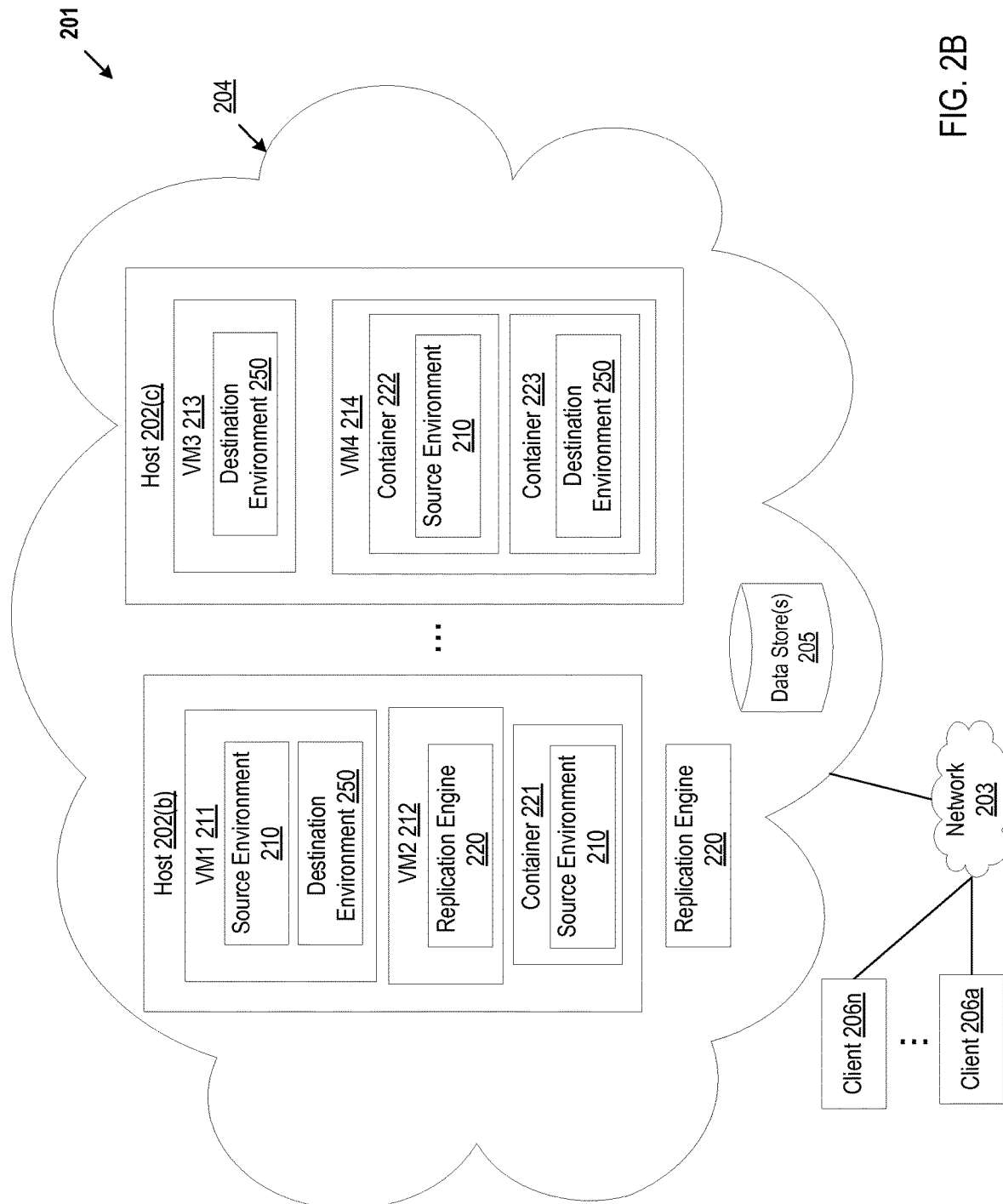

Implementations of the present disclosure describe a service for recreating a computing environment hosting an application. The service captures parameters from aspects of the computing environment hosting the application while not interrupting the computing environment. The parameters can include specific settings of the application, configurations of the operating environment, hardware specifications, etc. The service builds a hierarchical data scheme in a data store storing incremental changes of specific parameters as tags. The service links tags to snapshots of memory that correspond to a particular point in time. A snapshot can include a copy of data associated with the computing environment and/or application at a particular point in time. Implementations of the present disclosure describe an end-to-end solution for integrated copy data management to enable quick retrieval and recreation of a computing environment hosting an application.

Access to live data by other environments has generally been too costly or risky to automate. Traditionally, accessing a production environment for live data by other environments include intense coordination between development teams to avoid risks of contaminating the live data (e.g., production data) or harming performance of the production environment. For example, transferring live data from the production environment to a staging environment traditionally occurs infrequently and may include an incomplete portion of production data in order to avoid stressing a production database. Identical environments are typically difficult to create and maintain accurately due to access concerns and the frequency of changes in a secure production environment. For example, virtualized infrastructures employ applications that are traditionally restarted when imitating a specific virtual environment. Applications are traditionally replaced with a new version of the application in a virtual desktop image in order to restart the application without interfering with other components of the computing environment hosting the application. The imitated production data associated with an imitated environment for testing, maintenance, backup, diagnostics, staging, etc. quickly becomes outdated from the computing environment hosting the deployed production data. For example, when a change to deployed data causes an error, a testing environment with outdated production data is typically unable to identify the cause of an error due to the outdated values in the imitated production data of the testing environment or being unable access to the same data used by the production environment.

Implementations of the present disclosure capture and organize changes to a source environment (e.g., the production environment), including live data (e.g., the production data), that can then be shared with one or more destination environments to aid with software application development, maintenance, and error handling. Implementations of the present disclosure provide a non-intrusive ability to autonomously record changes in a source environment. Implementations of the present disclosure describe receiving a request to recreate an application from a particular point in time, determining a set of tags in a data store of hierarchical tags, copying a snapshot from the data store to a destination data store, recreating the source computing environment (e.g., production environment) hosting the application from the particular point in time in a replication destination environment using the set of tags and the copied snapshot, and modifying the copied snapshot in the destination data store. To recreate the source computing environment hosting the application, the service can use a set of tags that describe parameters of the source computing environment. In an implementation, the service can create a set of tags by scanning or monitoring the source computing environment. In another implementation, the service stores new tags based on a schedule or a policy. The snapshot of the source computing environment is linked to a set of tags using a source data tag as part of the determined set of tags.

FIG. 1 illustrates an example system architecture 100 for various implementations of the disclosure. The system architecture 100 can include a source system 110, a replication engine 120, and one or more destination systems 150(a-n) that may be coupled via a network 103. The network 103 can be a public network (e.g., the Internet), a private network (e.g., a local area network (LAN) or wide area network (WAN)), or a combination thereof. The systems (e.g., the source system 110, the replication engine 120, and the one or more destination systems 150(a-n)) can include one or more data processing devices, such as a desktop computer, a laptop computer, a mainframe computer, a personal digital assistant, a server computer, a handheld device or any other device configured to process data.

The source system 110 is a system capable of executing one or more applications (not shown). The source system 110 includes a computing environment with an operating system (OS) (not shown) to execute one or more associated applications. In an implementation, source system 110 is one or more processing devices executing an associated application and is coupled to the network 103.

The replication engine 120 provides a service to recreate a computing environment. For example, replication engine 120 can recreate the computing environment (e.g., a source environment) of the source system 110 including the one or more associated applications. In an implementation, the replication engine 120 is a data management service that scans the source system 110 and stores parameters in a storage system (not shown). In an implementation, replication engine 120 is a service that copies data from the source system 110 to a storage system and recreates the computing environment of the source system 110 on one or more destination systems 150(a-n).

The destination systems 150(a-n) are systems capable of executing the one or more applications associated with the source system 110. The destination systems 150(a-n) include computing environments with operating systems to execute the one or more applications. A destination system 150(a) can be a recreation of the source computing environment of the source system 110, for example, to rollback a change in the source system 110. The replication engine 120 recreates the source computing environment of the source system 110 in one or more destination systems 150(a-n). The destination system 150(a) includes a computing environment capable of executing the one or more applications associated with the source system 110.

System architecture 100 can also implement the source system 110, the replication engine 120, and the one or more destination systems 150(a-n) in various other combinations of computer systems or similar devices connected in various ways. For example, the one or more systems (e.g., the source system 110, the replication engine 120, and the one or more destination systems 150(a-n)) can provide the service to recreate a computing environment in a single system and/or a distributed system.

FIGS. 2A-B are example system architectures 200, 201 for various implementations of the disclosure. In FIG. 2A, the system architecture 200 can include a single, monolithic computer system, such as a host 202(a). The host 202(a) can include any data processing device, such as a desktop computer, a laptop computer, a mainframe computer, a personal digital assistant, a server computer, a handheld device or any other device configured to process data.

In an implementation, the host 202(a) can implement multiple environments including a source environment 210 (e.g., computing environment of source system 110 of FIG. 1) and/or a destination environment 250 (e.g., computing environments of the one or more destination systems 150 (a-n) of FIG. 1). In some implementations, the system 200 can implement more than one destination environment 250 (e.g., destination systems 150(a-n) of FIG. 1). In an implementation, the host 202(a) can include a replication engine 220 (e.g., replication engine 120 of FIG. 1) to provide a service to recreate a computing environment. In an example, host 202(a) is a desktop computer that implements the source environment 210, the replication engine 220, and the destination environment 250. The system architecture 201 can include one or more storage systems (e.g., one or more data store(s) 205) coupled to the host 202(a). For example, a data store 205 can be physically connected to host 202(a) or implemented as part of host 202(a). The data store(s) 205 can include application data (e.g., production data) used by one or more environments. In some embodiments, data store(s) 205 can be part of the source environment 210, and/or the destination environment 250. For example, source environment 210 can include data store 205. In an implementation, the data store(s) 205 include a data store managed by the replication engine 220 (e.g., a binding data store).

The one or more environments (e.g., the source environment 210, and/or the destination environment 250) can by a physical and/or a virtual environment. A virtual environment is an abstraction of one or more physical or logical components that allow different software modules to run. In an implementation, a single host 202(a) can host multiple virtualized environments (e.g., the source environment 210 and/or the destination environment 250) within a single host 202(a). Virtualized environments can allow a physical machine (e.g., host 202(a)) to operate as several different machines. The one or more environments (e.g., the source environment 210, and/or the destination environment 250) can execute one or more applications with access to resources (e.g., central processing units (CPUs), storage system, files, configurations, libraries, etc.) of the host 202(a).

FIG. 2B is an example system architecture 201 for various implementations of the disclosure. In FIG. 2B, the system architecture 201 can include a distributed system (e.g., a data center, a cloud 204, etc.) connecting multiple hosts (e.g., a host 202(b), a host 202(c)) that implement multiple environments (e.g., the source environment 210 and/or the destination environment 250). The system architecture 201 can include one or more storage systems (e.g., one or more data store(s) 205) in the cloud 204 or coupled to the cloud via the network 203. In some embodiments, data store(s) 205 can be part of the source environment 210, and/or the destination environment 250. For example, source environment 210 can include data store 205. In an implementation, the data store(s) 205 include a data store managed by the replication engine 220 (e.g., a binding data store).

The system architecture 201 can include multiple virtual machines (VMs), such as virtual machines 211-214, and/or containers, such as containers 221-223. Hosts 202(b-c) can host virtual machines 211-214 or and/or containers 221-223 in the cloud 204. For example, virtual machine VM1 211 and/or VM2 212 are hosted on host 202(b) in cloud 204. The hosts 202(b,c) of the cloud 204 can implement multiple environments (e.g., the source environment 210, and/or the destination environment 250). In some implementations, the system 201 can implement more than one destination environment 250 (e.g., destination systems 150(a-n) of FIG. 1).

The cloud 204 can include a replication engine 220 implemented by one or more of the hosts 202(b,c) to provide a service to recreate a computing environment. The replication engine 220 can be a service instantiated by host 202(b,c), for example, on VM2 212. In some implementations, replication engine 220 can be separate from hosts 202(b,c). The replication engine 220 can recreate a source environment 210 in one or more destination environments 250. One or more destination environments 250 can be on a different hosts (e.g., host(c)), different VMs (e.g., VM3 213, VM4 214), and/or different containers (e.g., container 222). In some implementations, replication engine 220 can restore a source environment 210 (e.g., in VM1 211) as discussed below in conjunction with FIGS. 3-5. The system architecture 201 can include one or more client computer systems, such as clients 206(a-n). Users can interact with the cloud-based VMs 211-214 using one or more client 206(a-n) via the network 203. For example, client 206 can interact with host 202(b) hosting VM1 211 via the network 203. The network 203 can be a public network (e.g., the Internet), a private network (e.g., a local area network (LAN) or wide area network (WAN)), or a combination thereof. Hosts 202(b,c) and clients 206(a-n) can include one or more data processing devices, such as a desktop computer, a laptop computer, a mainframe computer, a personal digital assistant, a server computer, a handheld device or any other device configured to process data.

Virtualized environments can allow a physical machine (e.g., host 202(b)) to operate as several different machines (e.g., VM1 211, VM2 212). The source environment 210 can execute one or more applications with access to resources (e.g., CPUs, storage system, files, configurations, libraries, etc.) of the one or more hosts 202(b,c) in the cloud 204. A cloud provider can supply the cloud 204. An application can be executed on computer hardware (e.g., hosts 202(b,c)) controlled by a provider that can span multiple different geographic locations. The multiple hosts 202(b,c) execute a hypervisor to run one or more virtual machines (e.g., VM1 211, VM2 212, VM3 213, VM4 214) hosting one or more applications. In an implementation, a hypervisor is a component of a host OS. Alternatively, the hypervisor may run on top of a host OS, or may run directly on host hardware without the use of a host OS. The hypervisor, though typically implemented in software, may emulate and export a bare machine interface to higher level software. Such higher level software may comprise a standard or real-time OS, may be a highly stripped down operating environment with limited operating system functionality, may not include traditional OS facilities, etc.

In some implementations, the hosts (b,c) can include one or more containers (e.g., a container 221, a container 222, and/or a container 223) to implement the multiple environments (e.g., source environment 210 and/or destination environment 250). A container (e.g., container 221, container 222, container 223) is a resource-constrained process space on the hosts (b,c) that can include the multiple environments (e.g., source environment 210 and/or destination environment 250) to execute one or more applications. In an implementation, multiple environments (e.g., the source environment 210 and/or the destination environment 250) can be virtual environments that allow various software modules (e.g., multiple operating systems) to run concurrently and in isolation from other software modules, on one or more interconnected hosts 202(b,c). Operating system-level virtualization can separate several applications into separate containers 221-223 for improved security, hardware independence, and added resource management features. In an implementation, the source environment 210 can execute a containerized application. A containerized application can utilize a kernel (not shown) to reduce or otherwise eliminate overhead needed to start and maintain full system virtualization. The containerized application can be isolated from other containerized applications with a separate source environment 210. In an implementation, multiple environments can utilize one or more containers (e.g., container 221, container 222, container 223) to execute one or more applications. For example, the replication engine 220 can recreate source environment 210 of container 221 in one or more destination environments 250. The destination environments 250 can be on a different hosts (e.g., host(c)), a different VMs (e.g., VM3 213, VM4 214), and/or different containers (e.g., container 222).

In some implementations, an application can access resources (e.g., processors, storage, network services, operating systems, specific development tools, a compiler, etc.) of the source environment 210 separate from other processes or applications running on an OS of the hosts 202(b,c). In an implementation, a containerized application can be a separate set of processes isolated from the other containerized applications of the hosts 202(b,c). For example, multiple containerized applications can run on a single kernel instance. Each containerized application can be rebooted independently and have root access, users, IP address(es), memory, processes, files, etc.

Some data store(s) 205 are layered file systems that layer disk images on top of and interconnect multiple different instances of a source environment 210. In some implementations, the data store(s) 205 can be implemented with storage virtualization to separate the storage hardware from the software that manages the storage infrastructure. In some implementations, the data store(s) 205 can use a storage hypervisor (not shown) to scan and analyze resources of the cloud 204. A storage hypervisor is a higher level of storage virtualization software that provides a comprehensive set of storage control and monitoring functions operating as a transparent virtual layer across consolidated disk pools to improve their availability, speed and utilization. The storage hypervisor virtualizes the individual storage resources to control and create one or more flexible pools of storage capacity. The storage hypervisor separates the direct link between physical and logical resources in parallel to virtual server hypervisors.

Figure 3:
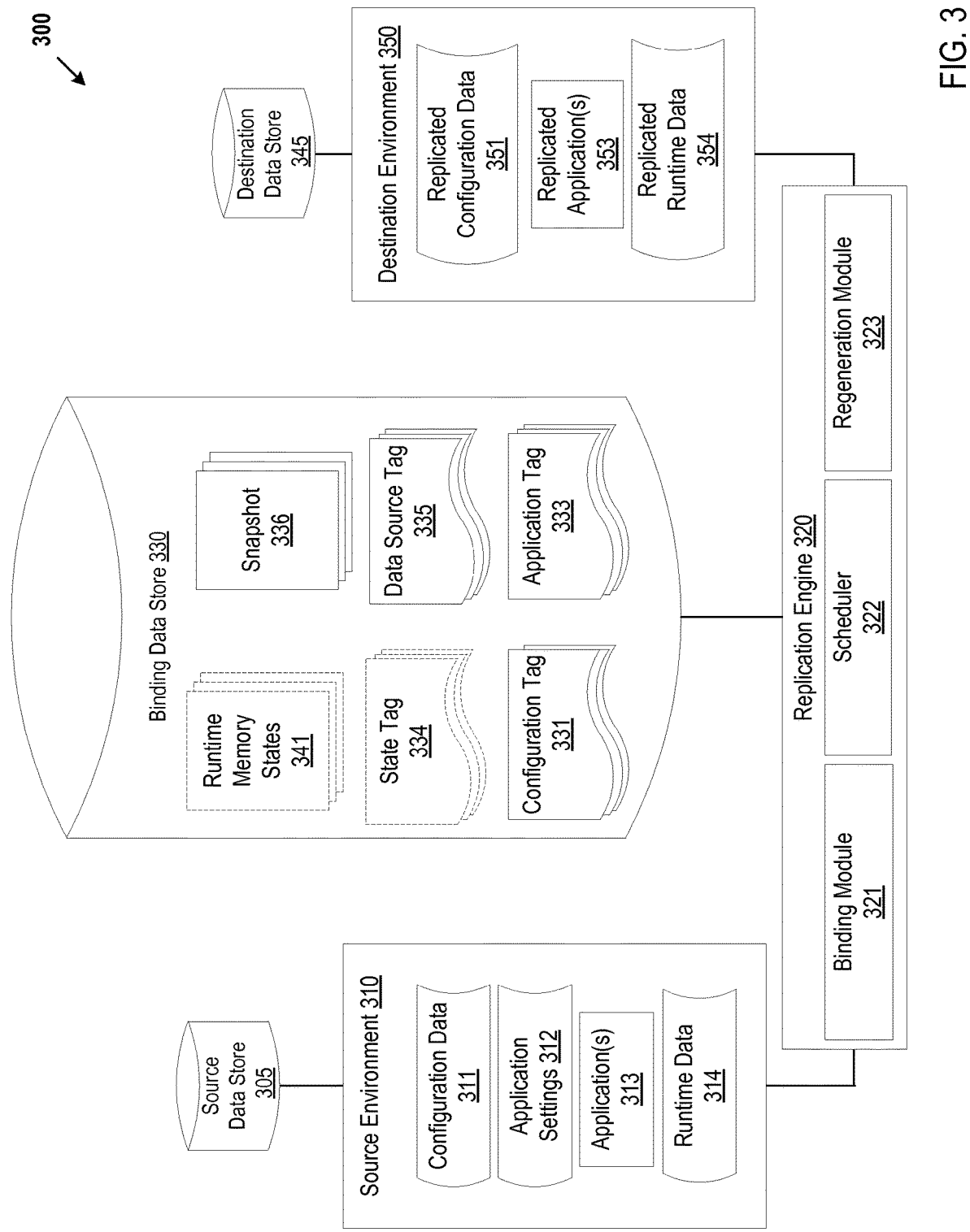
FIG. 3 is a block diagram of an example system including a replication engine, a source environment, and a destination environment, in accordance with one or more implementations of the present disclosure.

FIG. 3 is a block diagram of an example system 300 including a replication engine 320, a source environment 310, and destination environment 350, in accordance with one or more implementations of the present disclosure. The system 300 can be implemented in various combinations of computer systems or similar devices connected in various, as discussed in greater detail above in conjunction with FIGS. 1-2. The system 300 includes the source environment 310 (e.g., computing environment of source system 110 of FIG. 1 and source environment 210 of FIG. 2), the destination environment 350 of (e.g., computing environment of destination system 150(a) of FIG. 1 and destination environment 250 of FIG. 2), and the replication engine 320 (e.g., replication engine 120 of FIG. 1 and replication engine 220 of FIGS. 2A-B). In some implementations, the system 300 can implement more than one destination environment 350 (e.g., the destination systems 150(a-n) of FIG. 1).

In system 300, the source environment 310 can include configuration data 311, application settings 312, one or more applications 313, and runtime data 314. A source data store 305 is memory physically or logically associated with the source environment 310. In some implementations, the source data store 305 is a virtual disk associated with a physical storage location on a host (e.g., hosts 202(a-c) of FIG. 1). In some implementations, each environment (e.g., source environment 310, destination environment 350) can have one or more data volumes (e.g., source data store(s) 305, destination data store 345). The source data store 305 is data storage physically or logically associated with source environment 310. The source data store 305 can include production data (e.g., live data) used by the one or more applications 313 and store application settings 312 of the source environment 310.

Configuration data 311 of the source environment 310 can include configurations from various resources (e.g., processors, storage, network services, operating systems, specific development tools, a compiler, etc.), for example, but are not limited to, underlying hardware resources (e.g., number of hosts 202(a-c) of FIGS. 2A-B, number of physical processors, number of processing cores, quantity and type of physical network interfaces, network bandwidth capability, power usage, reliability (i.e., uptime), etc.), storage resources (e.g., RAM capacity, physical storage capacity, etc.), and/or virtual resources (e.g., number of virtual processors, virtual RAM capacity, virtual storage capacity, quantity and type of virtual network interfaces, number of virtual machines currently executing on a host, processor and memory usage by the virtual machines, etc.).

The source environment 310 is a source computing environment that can execute one or more applications 313. The one or more applications 313 can be any combination of software and hardware to perform a desired function, for example, a web application, a desktop application, a browser application, etc. The one or more applications 313 can be a single software program that operates with a hardware platform or with multiple software components written in different programing languages. Resources of the source environment 310 for a particular application 313 can include the OS, the storage system, a specific development tool or compiler, etc. Application settings 312 of each of the one or more applications 313 can include packages, versions, extensions, plug-ins, metadata, or other specific application attributes.

Runtime data 314 of the source environment 310 includes resources and information used by executing applications 313. For example, runtime data 314 can include values of variables, loaded libraries, registers, instructions pointers, and active files used by the one or more applications 313 residing in temporary memory. In some implementations, runtime data 314 can include network connection information of the source environment 310. For example, the source environment 310 executing applications 313 may establish one or more network connections to devices, network resources, and/or cloud services at different points in time. The network connection information can include addresses, protocols, port assignments, received instructions, and any information necessary to establish the network connections of the source environment 310 at a particular point in time. The source environment 310 executing one or more applications 313 includes runtime data 314 used by the one or more applications 313. The OS of the source environment 310 associate temporary memory to host the runtime data 314 when the application 313 is executing. In an implementation, the OS of the source computing environment 310 can capture the runtime data 314 at a point in time when the application 313 is executing.

The replication engine 320 is a data management service that stores binding data of the source environment 310 in a binding data store 330. The 320 replication engine includes a binding module 321, a scheduler 322, and a regeneration module 323. The binding module 321 can perform scans of the source environment 310 to collect binding data (e.g., a snapshot 336, one or more tags, and/or runtime memory states 341) that describes the source environment 310 at a particular point in time. The regeneration module 323 recreates the source environment 310 in one or more destination environments 350 using the binding data (e.g., a snapshot 336, one or more tags, and/or runtime memory states 341). The scheduler 322 and binding module 321 operate to perform copy data management services that enable quick retrieval and recreation of the source environment 310, as discussed below.

The destination environment 350 is a computing environment that can execute one or more recreated applications 353. The destination environment 350 is configurable to recreate the source environment 310 with replicated configuration data 351. In some implementations, the destination environment 350 includes replicated runtime data 354 to recreate one or more applications without stopping the application 313 in the source environment 310. Using the replicated runtime data 354, the destination environment 350 can execute the one or more recreated applications 353 without restarting an entire application. In some implementations, the regeneration module 323 generates the destination environment 350 to restore or roll-back the source environment 310. In some implementations, the regeneration module 323 generates one or more destination environments 350 to replicate the source environment, as discussed below.

Binding data (e.g., a snapshot 336, one or more tags, and/or runtime memory states 341) can describe the source environment 310 at a particular point in time. The binding module 321 can store parameters (e.g., configuration data 311 of the source environment 310, application settings 312, etc.) that describe the source environment 310. The binding module 321 can perform scanning, monitoring, capturing, storing, and replicating parameters to describe the source environment 310. In an implementation, the binding module 321 can use system tracking and data analysis to identifying parameters to store as binding data. In an implementation, binding module 321 maps relationships and location of parameters in persistent memory and/or temporary memory based a received request. For example, the binding module 321 can use a hypervisor to monitor multiple threads/ processes (e.g., Java applets, not shown) and collect configuration data, statistical data, and behavior of computer system entities (e.g., CPU, memory, devices, operating systems) associated with the source environment 310. In another example, the binding module 321 can use a checkpoint tool to monitor multiple threads/processes and collect configuration data, statistical data, and behavior of computer system entities. In an implementation, the replication engine 320 can identify which parameters to capture or receive information regarding which parameters to capture (e.g., from a system administrator). The binding module 321 can store the parameters of the source environment 310 as one or more tags of the binding data in the binding data store 330. The binding module 321 can identify configuration data 311 of the source environment 310 based on a scan of the source environment 310. For example, binding module 321 can store the configuration data 311 of the source environment 310 as a configuration tag 331 in the binding data store 330. The binding module 321 can identify application settings 312 of the one or more applications 313 based on a scan of the source environment 310. The binding module 321 can store the application settings 312 of the one or more applications 313 of the source environment 310 as an application tag 333 in the binding data store 330. In implementations, the binding module 321 can perform continuous data collection or near-continuous data collection on an ongoing basis.

The replication engine 320 includes a scheduler 322 to schedule the binding module to scan and collect binding data from the source environment 310 and the source data store 305. In implementations, the binding module 321 can store parameters (e.g., configuration data 311 of the source environment 310, application settings 312, etc.) at checkpoints, at periodic intervals (e.g., once per minute, per hour, per day, etc.), or in response to observed behaviors (e.g., an error, registry a modification, a log update, tracking and data analysis statistics, etc.). The scheduler 322 can trigger the binding module 321 to monitor the one or more applications 313, scan the resources (e.g., processors, storage, network services, operating systems, specific development tools, a compiler, etc.) of the source environment 310, and read the source data store 305 to determine any changes to parameters (e.g., configuration data 311 of the source environment 310, application settings 312, etc.). For example, the source environment 310 upgrading an application 313 can change one or more application settings 312 described by an application tag 333. For example, the application version number can change from 1.01 to 1.02. The scheduler 322 can associate a timestamp or key value to the binding data (e.g., a snapshot 336, one or more tags, and/or runtime memory states 341) in the binding data store 330.

The scheduler 322 can trigger the binding module 321 to store a snapshot 336 of the source data store 305 in the binding data store 330. An initial snapshot can include an underlying disk image of the source data store 305. A disk image includes the contents and structure of a source physical storage device (e.g., a hard disk drive, an optical disc, a flash drive, etc.) as a copy with independent control to read and write data. The image can span one or more physical devices. In a virtualized storage implementation, a storage hypervisor can create a snapshot 336 for the binding module 321 to store in the binding data store 330.

The replication engine 320 stores the captured snapshot as a snapshot 336. After the binding module 321 stores the initial snapshot, modifications to the source data store 305 can trigger the binding module 321 to store one or more additional snapshots 336. Each snapshot 336 can include one or more files. The binding module 321 can read the source data store 305 to avoid interrupting the underlying source data store 305. In an implementation, binding module 321 stores a snapshot 336 and the parameters at a scheduled time. In an implementation, binding module 321 stores a snapshot in response to determining a parameter in the source environment 350 has changed. In an implementation, binding module 321 captures a snapshot 336 in response to a request. The snapshot 336 describes the data store 305 of the source environment 310 at the particular point in time captured. The binding module 321 can append a timestamp or key value to the snapshot 336 to identify the particular point in time that the snapshot was created. In an implementation, multiple applications 313 can be running on the source environments 310.

The binding module 321 can store the runtime data 314 associated with each of the one or more applications 313 as runtime memory states 341. Runtime data 314 can include values of variables, loaded libraries, registers, instructions pointers, and active files used by the application 313 associated with running one or more applications 313 in temporary memory of the source environment 310. In some implementations, runtime data 314 includes network connection information (e.g., addresses, protocols, port assignments, received instructions, etc.) of one or more network connections of the source environment 310. The OS of the source environment 310 can create a dump file to capture the runtime data 314 associated with the application 313 without stopping the application 313 in the source environment 310. The binding module 321 can store the captured runtime data 314 as runtime memory states 341 in binding data store 330. Runtime memory states 341 can include resources and information used by executing applications 313 at a particular point in time. For example, runtime memory states 341 can include values of the runtime data 314 used by the application 313 residing in temporary memory at the particular point in time. The runtime memory states 341 can include runtime network connection states with the network connection information of the one or more network connections. The runtime network connection states include the information necessary to replicate the network connections of the source environment 310 at a particular point in time.

In a virtual environment running an OS, the dump file can be captured from a virtual disk. A virtual disk (e.g., source data store 305) is associated with a physical storage location on the host (e.g., hosts 202(a-c) in FIGS. 2A-B). In some implementations, the source environment 310 can have one or more source data stores 305 (e.g., one per virtual hard drive). The binding data store 330 can store runtime memory states 341 (e.g., values of variables, loaded libraries, and active files used by the application 313) by locating one or more dump files associated with the virtual environment in persistent memory associated with the OS executing the application 313. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. In some implementations, the source data store 305 and/or the destination data store 345 can be implemented with storage virtualization to separate the storage hardware from the software that manages the storage infrastructure.

In an implementation, binding module 321 collects runtime data 314 via checkpointing or a dump of temporary memory associated with the source environment 310. The replication engine 320 stores the runtime data 314 as runtime memory states 341. For example, in a long-running application, the scheduler 322 can schedule continuous runtime checkpoints to improve service level high availability. The binding module 321 can append a timestamp or key value to the runtime memory states 341 (e.g., values of variables, loaded libraries, and active files used by the application 313) to identify the particular point in time the runtime data 314 describes.

The replication engine 320 stores one or more values or pointers that describe the parameters (e.g., configuration data 311 of the source environment 310, application settings 312 of application 313, etc.). For example, the replication engine 320 can store the configuration tag 331 to describe the configuration data 311 of the source environment 310. The replication engine 320 can store the application tag 333 to describe application settings 312 of the one or more applications 313 of the source environment 310. The replication engine 320 stores one or more tags (e.g., the configuration tag 331, the application tag 333, the data source tag 335, and/or the state tag 334) in the binding data store 330. The binding data store 330 can store one or more snapshots 336, such as one or more snapshots 336 from the source data store 305, or files (e.g., a dump file of runtime memory states 341), as described herein. The binding data store 330 can be a persistent storage that is capable of storing data. The binding module 321 can store files from the source data store 305 in the binding data store 330.

The binding module 321 of the replication engine 320 is coupled to the binding data store 330 to store the one or more parameters as tags (e.g., a data source tag 335, one or more application tags 333, the configuration tag 331, and/or a state tag 334). A set of tags can include one or more types of tags that describe the source environment 310 at a particular point in time. For example, one or more application tags 333 describe application settings 312 (e.g., a version number of the applications, build dates, etc.) of the one or more applications 313. The binding module 321 can identify settings of the one or more applications 313 based on a scan of the source environment 310. The configuration tag 331 describes configuration data 311 of resources (e.g., underlying hardware resources, storage resources, and/or virtual resources) of the source environment 310. A data source tag 335 identifies a snapshot 336 from the source data store 305.

Some implementations include a state tag 334 that identifies runtime memory states 341 to describe runtime data 314. In some implementations, the state tag 334 is stored when the source environment 310 is executing the one or more applications 313. The tags can synchronize the parameters for the source environment 310 as a set that corresponds to a particular point in time. A 'set', as used herein, refers to any positive whole number of items. The set of tags include the combination of parameters and the production data to accurately describe the source environment 310 in an efficient and non-intrusive manner. The binding data store 330 can store the tags and catalog new tags. In an implementation, the binding module 321 can store a new tag and associate a timestamp or key value in a hierarchical table. The replication engine 320 can synchronize tags using the associated timestamp or key value to identify the particular point in time each tag describes.

Regeneration module 323 of the replication engine 320 can access the binding data store 330 to recreate the source environment 310 from a particular point in time. The replication engine 320 can recreate the source environment 310 in the destination environment 350. In some implementations, the destination environment 350 is the original application environment (e.g., the source environment 310) and/or one or more replicated environments that are application-aware. For example, the replication engine 320 can overwrite the original application environment (e.g., the source environment 310) to restore the source environment 310. The destination environment 350 can be built to roll back the application to a particular point in time or updated to reflect changes made in the original source environment 310.

Regeneration module 323 can look-up a set of tags for a particular point in time in the binding data store 330. Regeneration module 323 load parameters and resources of the destination environment 350 based on the set of tags. Using the set of tags that describe a source environment for a particular point in time, the regeneration module 323 can configure the destination environment 350, deploy the replicated application 353, and copy a snapshot 336 into the destination data store 345. The regeneration module 323 can use binding data associated with the set of tags from the binding data store 330 to determine the parameters and resources to recreate the source environment 310 in the destination environment 350. In some implementations, recreating the source environment 310 includes deploying the one or more replicated applications 353 from the respective point in time using stored runtime memory states 341 of the source environment 310. The regeneration module 323 deploys the replicated application 353 and copies the replicated runtime data 354 into the destination environment 350. In an implementation, the regeneration module 323 can establish replicated network connections for the destination environment 350 from the respective point in time based on runtime network connection states of the stored runtime memory states 341. Accordingly, the one or more applications 313 do not have to be stopped or restarted thereby minimizing service disruption.

In some implementations, the replication engine 320 generates multiple replicated environments that are application-aware. The regeneration module 323 can build a destination environment 350 that includes replicated configuration data 351, one or more replicated applications 353, and/or replicated runtime data 354. The regeneration module 323 can use the data source tag 335 of the set of tags to copy a snapshot of the source data store 305 to the destination data store 345. The regeneration module 323 can configure the destination environment 350 with replicated configuration data 351 that matches the configuration data 311 of the source environment 310 at a selected point in time using the information described in the corresponding configuration tag 331. For example, when recreating a destination environment 350, the regeneration module 323 can use the configuration tag 331 to load a desired OS along with system drivers. The one or more replicated applications 353 can match the one or more source applications 313 at the selected point in time using the application settings 312 described in the corresponding application tag 333. In an implementation the regeneration module 323 uses the state tag 334 to load the runtime memory states 341 into the replicated runtime data 314 to deploy the replicated application 353 from the particular point in time. For example, the replicated application 353 in the destination environment 350 can include replicated network connections that match the runtime network connection states associated with the source environment at the respective point in time.

Figure 4:
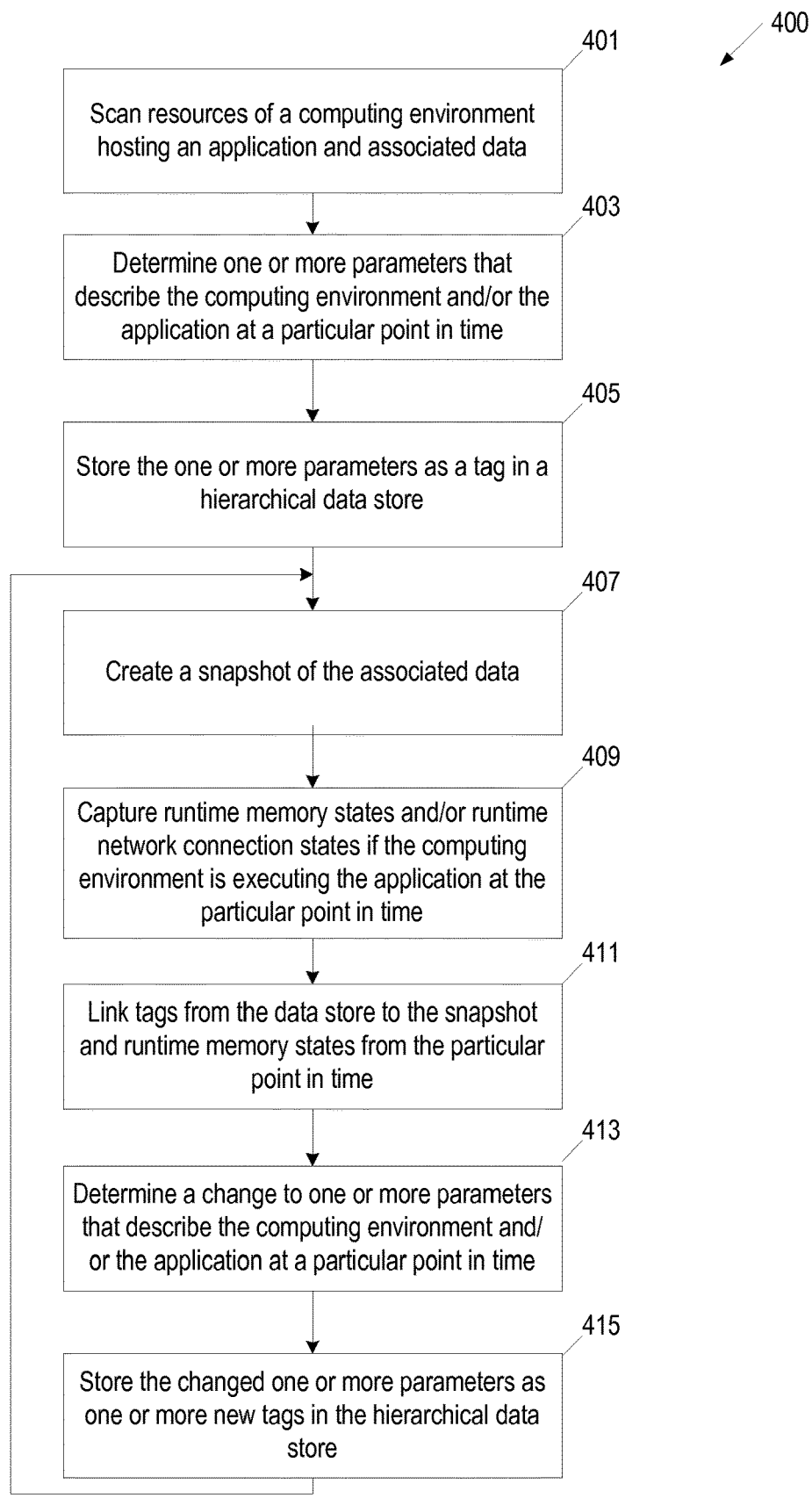
FIG. 4 is a flow diagram for a method for creating a set of tags for a source environment, in accordance with one or more implementations of the present disclosure.

FIG. 4 is a flow diagram for a method 400 for creating a set of tags for a source environment, in accordance with one or more implementations of the present disclosure. Method 400 can be performed by processing logic that can comprise hardware (e.g., circuitry, dedicated logic, programmable logic, microcode, etc.), software (e.g., instructions run on a processing device), or a combination thereof. In an implementation, method 400 is performed by a binding module (e.g., binding module 321 of FIG. 3) executed by a processing device in a computing machine. At least a portion of method 400 can be performed automatically by the computing machine without user interaction.

At block 401, the processing device scans resources (e.g., processors, storage, network services, operating systems, specific development tools, a compiler, etc.) of a computing environment hosting an application and associated data. The computing environment hosting the application can also host one or more applications, as discussed above. Scanning can create a reference point used to describe the computing environment. The scanning for the associated data can include mapping virtual memory byte-for-byte to correlate with portions of a file, data store, or disk image used by the computing environment. In some environments, the processing device maps memory addresses used by the application (e.g., virtual addresses) as physical addresses in computer memory.

In an implementation, the processing device employs a policy to schedule scanning of resources (e.g., processors, storage, network services, operating systems, specific development tools, a compiler, etc.) of the computing environment to create tags. The policy schedule can be based on a time interval, in response to a detected event, logic, or user request. In some implementations, the policy can be a retention policy, error-handling policy, migration policy, or ad hoc request. For example, the processing device can scan the computing environment every 2 minutes based on a retention policy. More than one policy can be implemented. The processing device trigger a scan to capture parameters as an initial set of tags that describe the computing environment as discussed below. For example, the processing device employing an error-handling policy scans the computing environment in response to an error to identify changes from a prior scan. A user can also trigger creation of the set of tags via an ad hoc request.

At block 403, the processing device determines one or more parameters that describe the computing environment and/or the application at a particular point in time. For example, the processing device can collect configuration data, statistical data, and behavior of computer system entities (e.g., CPU, memory, devices, operating systems) associated with the computing environment. The processing device can identify settings of the one or more applications based on a scan of the source environment.

At block 405, the processing device stores the one or more parameters as a tag in a hierarchical data store. A tag can be used to store a specific parameter of the computing environment (e.g., production environment). For example, an application tag can identify the application version, a build time, and/or network configuration. A tag is a data structure that identifies a piece of information to describe the one or more parameters. A tag can, for example, store data of a parameter, an identifying portion of the parameter data, point to a location where the parameter data is stored, or assign a term to represent the information. The tag describes the one or more parameters and allows the parameter data to be compared to a prior tag. The tag also enables recreation of the computing environment and the application as discussed in greater detail below in conjunction with FIG. 5. Types of tags can include an application tag describing settings associated with the application, a configuration tag describing configurations of the computing environment, a data source tag describing the snapshot of the data volume, or a state tag describing runtime memory states and runtime network connection states if the application is executing.

The hierarchical data store of tags organizes tags by type and can include an identifier to record the point in time. The processing device creates tags using different policies. The processing device can store tags separately and use tags of different types together. For example, tags created by an error-handling policy can be compared to tags created by a retention policy. Using a hierarchical data store to store sets of tags reduces the storage size of the data store and increase processing efficiency.

At block 407, the processing device creates a snapshot of the data associated with the computing environment. A snapshot is a representation of the state of memory associated with the computing environment at a particular point in time. A snapshot can be a copy of a volume at a particular point in time. The processing device can schedule to copy the data volume. In an implementation, the processing device can version the snapshots. To version the snapshots, each volume can be augmented with a new kind type to describe the volume hierarchy. Data volume versioning can create writable snapshots by coping new portions of a volume to a previous version of a snapshot. In some implementations, a logical volume manager can be used to map the associated data among multiple data volumes. For example, a storage system associated with a VM can include multiple volumes and a logical volume manager can map the multiple volumes. To create a snapshot among multiple data volumes, the processing device can use data volume versioning of each volume. In an implementation, the processing device can combine multiple snapshots to represent the state of the computing environment at a particular point in time. In some implementation, the processing device can replay failed transactions to create a consistent versioned copy of the persistent data without stopping, interrupting, or modifying the source computing environment.

The processing device creates the data source tag to describe the snapshot. The processing device creates a copy of the snapshot and associates the copied data to the data source tag. As discussed in greater detail below in conjunction with FIG. 5, the snapshots can be a root of other volumes, bound to a named volume, and mounted in a replication data volume. The snapshots are copied without modifying the root volume from the derived copy from storage.

At block 409, the processing device captures runtime memory states and runtime network connection states if the computing environment is executing the application at the particular point in time. The processing device creates the state tag to describe the runtime memory states and/or runtime network connection states. For example, the state tag can include information identifying the application running when the runtime memory states and/or runtime network connection states are captured, the particular time the runtime memory states and/or runtime network connection states are stored, and the locations of the stored runtime memory states and/or runtime network connection states.

In implementations of the present disclosure, the processing device can copy the runtime memory states and runtime network connection states from a file (e.g., a dump file) of the operating system. A dump file is a persistent memory copy of an application's temporary memory values at a point in time. The dump file can include the executing processes, network connection information, and loaded modules of executing applications. The dump file can capture what is in the applications memory at that point in time.

In an implementation, a checkpoint can copy data from the temporary or virtual memory to persistent storage. The processing device can run continuous checkpoints in a userspace or kernel. User space is a portion of memory in which user processes run. Kernel space is a portion of memory in a kernel executes and provides services to control processes. In some implementations, the processing device can execute a checkpoint tool (e.g., Checkpoint/Restore In Userspace) to identify runtime memory states and/or runtime network connection states if the computing environment is executing the application at the particular point in time. The checkpoint tool can identify a set of processes and the data structures associated with the identified processes (e.g., opened files, sockets, inter-process communication objects, network connections, etc.). Inter-process communication (IPC) is the activity of sharing data across multiple processes using communication protocols. The checkpoint tool can intercept and redirect requests by the application code to establish network connections, access settings and/or associated memory within the computing environment. The checkpoint tool can be used to capture the runtime memory states and runtime network connection states.

As discussed above, an application can be run in multiple reproduced destination environments for testing, error handling, etc. Coordinating a snapshot of source data with the source environment configurations and source application settings allows multiple destination environments to replicate the source environment without interrupting or disturbing the live data. A grouping of tags can be used to describe the source environment with a version of live data at a particular point in time. Real-time capture of the source environment through data volume versioning can share minor changes made in a production source environment with multiple destination environments.

At block 411, the processing device links tags from the data store to the snapshot and runtime memory states from the particular point in time. For example, the application tags and configuration tags in the data store can be associated with one or more data source tags to link each tag with at least one snapshot of the source data store. The processing device can use a timestamp or key value appended to each tag and snapshot to link each tag with at least one snapshot of the source data store. The application tags and configuration tags in the data store can also be associated with one or more state tags to link each tag with at least one copy of runtime memory states of the source environment executing an application. In some implementations, the state tags can also link each tag with at least one copy of runtime network connection states of the source environment executing an application.

In an implementation, the processing device can store a new tag and associate a timestamp or key value in a hierarchical table. A tag in the data store can belong to more than one set of tags. For example, a number of processors in a source environment may change less frequently than the version of a database application in the source environment. The processing device can use the hierarchical table to catalog tags by type and index the timestamp or key value of the changed tag. The processing device can link a tag to one or more snapshots, runtime memory states, and/or runtime network connection states that corresponds to different points in time. For example, the processing device can link a configuration tag describing the number of processors of the source environment to one or more snapshots and runtime memory states from the different points in time using the timestamp or key value in the hierarchical table.

The tags in the data store that describe parameters of the computing environment are grouped as a set that corresponds to different points in time. Using the data tag, the processing device stores a new snapshot that includes the changed portion of the data volume since the previous snapshot of the data volume. The data source tag can point to the stored snapshot in the hierarchical data store. The processing device can use the timestamp or key value to link the data source tag of the snapshot with one or more tags in the hierarchical data store. The state tag can point to the stored runtime memory states and runtime network connection states in the hierarchical data store. The processing device can link the state data tag to a copy of the runtime data to enable the application to be recreated without restarting.

At block 413, the processing device determines a change to one or more parameters that describe the computing environment and/or the application at a particular point in time. For example, upgrading a database application to a new version changes a parameter describing the database application in the computing environment. The processing device can compare the tags previously stored (e.g., block 405) to identify a parameter that changed since the last scan.

At block 415, the processing device stores the changed parameters as one or more new tags in the hierarchical data store. The processing device can repeat blocks 407-411 to update the snapshot, runtime memory states, and runtime network connection states at a respective point in time. At block 407, the processing device can create a new snapshot of changes to the source data volume since a previous snapshot. At block 409, the processing can create a new capture of the runtime memory states and runtime network connection states that correspond the time the determined one or more parameters changed.

At block 411, the processing device can link a new set of tags for the particular point in time to represent changes to the parameters in the hierarchical data store. As discussed above, the set tags can be hierarchical. The processing device can group the set of tags to provide a hierarchical description of the application environment parameters that have changed since a previous capture. Some parameters may change more frequently than others. For example, a number of processors may not change as frequently as the version of a database application in a computing environment. The processing device determines previously stored tags that represent unchanged parameters that correspond to a new tag describing a changed parameter. The processing device can use previously stored tags to group tags as a set of tags to describe the relevant parameters of the computing environment at the respective point in time. Using the data tag, the processing device stores a new snapshot that includes the changed portion of the data volume since the previous snapshot of the data volume. The data source tag can point to the stored snapshot in the hierarchical data store. The processing device can use the timestamp or key value to link the data source tag of the snapshot with one or more tags in the hierarchical data store. The processing device can link the state data tag to a copy of the runtime data to enable the application to be recreated without restarting. The processing device can use the runtime data to enable the application to recreate runtime network connection states of network connections to be recreated.

Figure 5:
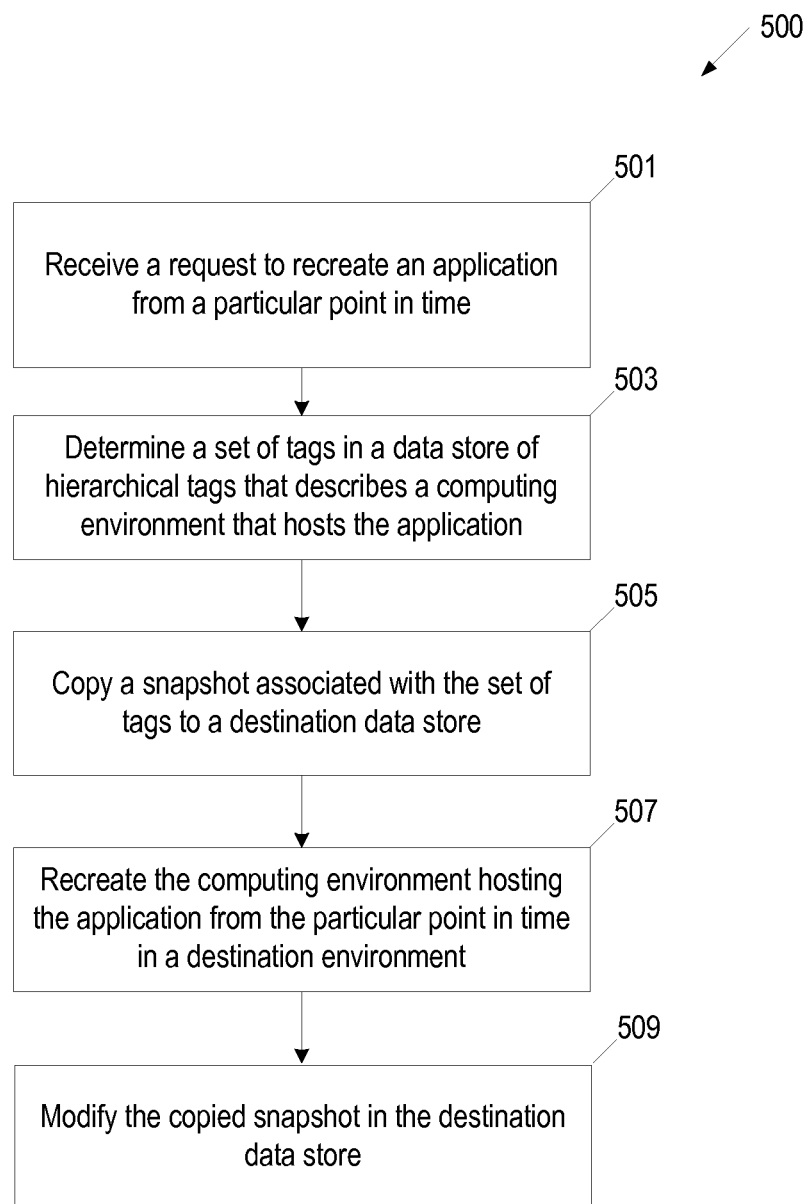
FIG. 5 is a flow diagram for a method for replication of an environment, in accordance with one or more implementations of the present disclosure.

FIG. 5 is a flow diagram for a method 500 for replication of an environment, in accordance with one or more implementations of the present disclosure. Method 500 can be performed by processing logic that can comprise hardware (e.g., circuitry, dedicated logic, programmable logic, microcode, etc.), software (e.g., instructions run on a processing device), or a combination thereof. In one implementation, method 500 is performed by a regeneration module (e.g., regeneration module 323 of FIG. 3) executed by a processing device in a computing machine. At least a portion of method 500 can be performed automatically by the computing machine without user interaction.

At block 501, the processing device receives a request to recreate an application from a particular point in time. The processing device can receive the request to recreate the application from a user, an application, or via a network. For example, the processing device can recreate an application in response to receiving an error diagnostics request triggered by an error that occurred at particular point in time. The processing device can recreate the computing environment and deploy the application to enable a replication environment to recreate the error. For example, a database vendor can provide remote support for a customer that experiences an error in the customer's application environment. The error can trigger the error diagnostics request from the customer. The processing device of the vendor can receive the error diagnostics request from the customer.

At block 503, the processing device determines a set of tags in a data store of hierarchical tags that describe a computing environment that hosts the application. As discussed above, the set of tags can include an application tag describing settings associated with the application, a configuration tag describing configuration data of the computing environment, a data source tag describing a snapshot of the data volume, and/or a state tag describing runtime memory states and/or runtime network connection states if an application is executing at the particular point in time. The request can include a timestamp or key value (e.g., an application version number, an index identifier, an error code, a bug report, a command, etc.) that identifies the particular point in time. The processing device can use the timestamp or key value from the request to determine the corresponding set of tags in the hierarchical data store. The processing device may determine the set of tags closest in time to the timestamp or key value. In an implementation, the processing device can determine a tag describing a parameter that changed near (e.g., before or after) the time indicated by the timestamp or key value. For example, the processing device can determine the configuration tag changed at the time indicated by the timestamp or key value. The processing device can look-up an application tag that changed near (e.g., before or after) the time indicated by the timestamp or key value to determine the set of tags closest in time to the timestamp or key value. A tag can be linked to one or more sets of tags. The set of tags can include one or more tags created at an earlier point in time to describe the most recent change to a parameter in view of the timestamp or key value. For example, the determined set of tags, by the processing device, can include a data source tag describing a snapshot created at the particular point in time in view of the request and an application tag describing the application before the time associated with the snapshot.

In response to a request to recreate a source environment that crashed, the processing device can identify an earlier set of tags in the hierarchical data store to recreate the source environment in the destination environment to an earlier point in time before an error occurred. If the request destination environment is the same source environment, the processing device can roll-back the source environment in the destination environment to an earlier point in time before an error occurred. For example, the request can include a timestamp and indicate a network error. The processing device can use the timestamp to determine the tag describing the network configurations at a point in time near or earlier than the timestamp. In an implementation, in response to receiving a request, the processing device can access the data store and determine the set of tags that describe the source environment at the relevant time. The processing device can load parameters and configure resources of the destination environment based on the set of tags. In an implementation, the processing device can determine one or more sets of tags, a corresponding snapshots, runtime memory states, and/or runtime network connection states to send to the vendor.

At block 505, the processing device copies the snapshot associated with the set of tags to a replication data store. In an implementation, the processing device uses branching for version control in the data store. When a change is made to the data store, the data is tested prior to sharing any changes into a destination environment. The processing device can employ branching to validate the cloned data before completing changes to a file in the data store. For example, the processing device validates by testing the cloned data prior to propagating any changes in a new snapshot.

At block 507, the processing device recreates the computing environment hosting the application from the particular point in time in a replication environment in view of the set of tags. The processing device can configure the replication environment based on the configuration tag. For example, the processing device can determine virtual resources to allocate to the replication environment based on the configuration tag. The processing device can instantiate a replicated application in the replication environment based on the application tag. For example, the processing device can determine the version and settings of the replicated application based on the application tag. The processing device can populate the replication data store with a snapshot based on the data source tag. For example, the processing device can copy a snapshot of production data from the hierarchical data store to the replication data store based on the data source tag. In some implementations, the set of tags includes a state tag describing the runtime memory states and/or runtime network connection states of the source environment executing the application. The processing device can load the runtime memory states and runtime network connection states based on the state tag. For example, the processing device can load the runtime memory states into temporary memory associated with the replication environment. The processing device can launch the application to match a state described by the runtime memory states at the respective point in time. In an implementation, the processing device can establish replicated network connections for the replication environment to match network connections described by runtime network connection states at the respective point in time.

The processing device can receive minimal information in the received request, such as specifying which application version to load, to look-up a set of tags in the hierarchical data store that satisfy the received request. The processing device can determine the set of tags that enable the environment to roll back, roll forward, access snapshots, and/or restore complete runtime environments. For example, in response to an error diagnostics request, a database vendor providing remote support for a customer that experiences an error in the customer's application environment can recreate the computing environment and deploy the application to enable a replication environment to recreate the error. The vendor deploys the replication environment using the set of tags in the data store from the customer's environment that corresponds to a time indicated in the error diagnostics request. The replication environment of the vendor can be configured based on the configuration tag. For example, the processing device can configure the network settings of the replication environment as described by the configuration tag. The processing device can load the database application with settings described by the application tag. For example, the processing device can load a specific version of the database application specified by the application tag. The processing device can populate the replication data store with a snapshot based on the data source tag. For example, the processing device can populate a database of the destination environment with live production data based on the snapshot identified by the data source tag.

The processing device can generate multiple replication environments and recreate the application from the particular point in time. In an implementation, the processing device creates an isolated copy of the snapshot for each replication environment. For example, the processing device can clone the snapshot in one or more destination data stores associated with multiple new environments. In some implementations, the processing device generates a new environment (e.g., replication environment) that is separate from the source computing environment. For example, a testing computing environment can be created separate from a source production computing environment. The testing environment can be identical to the production environment at a particular point in time. The processing device can recreate the production computing environment in the testing environment using a set of tags describing the configurations, application settings, a snapshot of production data, runtime memory states, and runtime network connection states of the production environment. In an implementation, the processing device generates the replication environment, deploys the application with the settings based on the application tag, populates the replication data store via a snapshot based on the source data tag, and can recreate the runtime memory state and runtime network connection states of the source environment at the particular point in time based on the state tag.

In an example, a received request includes an error code indicating an error associated with the memory state, and the processing device can load the memory states from a runtime memory states described by the state tag. The processing device can compare sets of tags describing the computing environment at earlier and later points in time to recreate the error and diagnose the cause of the error using diagnostics software. To compare sets of tags, the processing device can identify a tag with a consistent value that belongs to multiple sets of tags as an unchanged parameter. The processing device can search sets of tags to identify two sets of tags that include the tag with different values. For example, the processing device can identify the state tag that belongs to multiple sets of tags as an unchanged parameter in the sets of tags. In an example, the processing device can search sets of tags to identify two sets of tags that include state tags describing a change to the runtime memory states. For a received request from a customer indicating a database failure, the replication environment of the vendor can recreate the error to diagnose the cause of the error with minimal impact to the customer's application environment. Then the vendor can provide a solution to respond to the error diagnostics request.

At block 509, the processing device can modify the copied snapshot in the replication data store. In some implementations, the snapshot is stored and protected from being changed by the processing device. In an example, the snapshot is copied into the replication data store and the processing device may modify the copied snapshot. Since multiple replication environments can recreate the application from the particular point in time, each replication environment can modify a copy snapshot. For example, software development teams may test an application changing different configurations of a replication environment. The processing device can modify the copied snapshot in the replication data store. The copied snapshot serves as a root version in the replication data store to allow for testing, diagnostics, maintenance, and other software development services. The processing device writing over data of the copy in the replication environment avoids changing the snapshot in the hierarchical data store. The processing device can then create a reference point from the particular point in time of the copied snapshot and apply a tag creation process as discussed in greater detail above in conjunction with FIG. 4.

Figure 6:
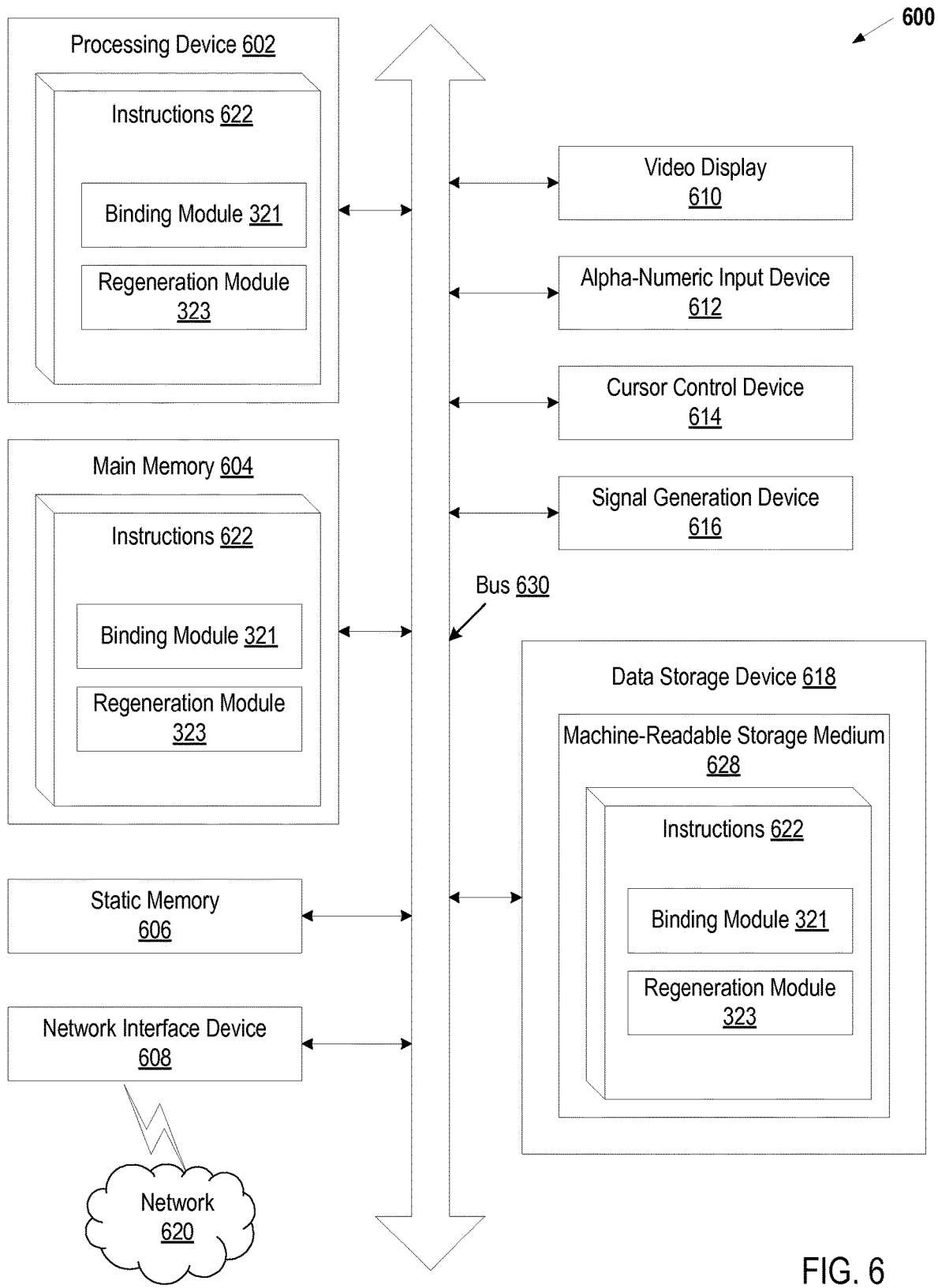
FIG. 6 illustrates an example machine of a computer system within which a set of instructions, for causing the machine to perform any one or more of the methodologies discussed herein, can be executed.

FIG. 6 illustrates an example machine of a computer system 600 within which a set of instructions, for causing the machine to perform any one or more of the methodologies discussed herein, can be executed. In alternative implementations, the machine can be connected (e.g., networked) to other machines in a LAN, an intranet, an extranet, and/or the Internet.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data store device 618, which communicate with each other via a bus 630.

Processing device 602 represents one or more general-purpose processing devices such as a microprocessor, a central processing unit, or the like. More particularly, the processing device can be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 can further include a network interface device 608. The computer system 600 also can include a video display unit 610 (e.g., a liquid crystal display (LCD) or a cathode ray tube (CRT), an alphanumeric input device 612 (e.g., a keyboard), a cursor control device 614 (e.g., a mouse), and a signal generation device 616 (e.g., speaker).

The data storage device 618 can include a machine-readable storage medium 628 (also known as a computer-readable medium) on which is stored one or more sets of instructions or software 622 embodying any one or more of the methodologies or functions discussed herein. The instructions 622 can also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a module (e.g., binding module 321 or regeneration module 323 of FIG. 3), and/or a software library containing methods that call the binding module and/or the regeneration module. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "monitoring" or "creating" or "describing" or "receiving" or "identifying" or "recreating" or "replicating" or "copying" or "cloning" or "validating" or "deploying" or "comparing" or "modifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus can be specially constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving a request to recreate an application from a particular point in time;
determining, by a processing device, a set of hierarchical tags in a data store of hierarchical tags, the set of hierarchical tags describes a computing environment hosting the application from the particular point in time;
copying, from the data store, a snapshot associated with a source data tag of the set of hierarchical tags; and
recreating the computing environment hosting the application from the particular point in time in a replication environment using the set of hierarchical tags and the snapshot.

2. The method of claim 1, wherein the hierarchical tags in the data store are created in response to a change to parameters of the computing environment, and wherein the set of hierarchical tags comprises at least an application tag describing settings associated with the application or a configuration tag describing configuration data of the computing environment.

3. The method of claim 1, wherein the set of hierarchical tags comprises a state tag describing runtime memory states and runtime network connection states of the computing environment hosting the application from the particular point in time.

4. The method of claim 3, wherein recreating the computing environment hosting the application further comprises:
deploying the application from the particular point in time in view of the state tag; and
modifying the copied snapshot in a replication data store to which the snapshot is copied.

5. The method of claim 1, wherein the application is a containerized application.

6. The method of claim 4, wherein the request is in response to an error diagnostics request for an error from the particular point in time, and deploying the application enables the replication environment to recreate the error.

7. The method of claim 1, wherein the data store comprises a hierarchical table, and wherein recreating the computing environment further comprises determining a recent change to a tag in the data store in view of the request.

8. The method of claim 1, wherein the data store comprises a plurality of sets of tags that describe parameters of the computing environment at different times, each set of hierarchical tags being created in view of a policy that schedules creation of a new snapshot to capture changes to the computing environment.

9. A system comprising:
a memory; and
a processing device operatively coupled with the memory, the processing device to:
receive a request to recreate an application from a particular point in time;
determine a set of hierarchical tags in a data store of hierarchical tags in view of a recent change to a tag in the data store, the set of hierarchical tags describing a source environment hosting the application;
build a replication environment in view of the set of hierarchical tags, the replication environment modifying a cloned snapshot of the source environment; and
recreate the replication environment hosting the application from the particular point in time in view of a state tag.

10. The system of claim 9, wherein the set of hierarchical tags comprises the state tag describing runtime memory state of the source environment from the particular point in time, and wherein the set of hierarchical tags comprises at least an application tag to describe settings associated with the application or a configuration tag describing configuration data of the source environment.

11. The system of claim 9, wherein the processing device is further to wherein the data store comprises a hierarchical table, and wherein the processing device is further to link tags from the data store to the snapshot in view of the request.

12. The system of claim 9, wherein the application is a containerized application.

13. The system of claim 9, wherein the request is in response to an error diagnostics request for an error from the particular point in time, and deploying the application enables the replication environment to recreate the error.

14. The system of claim 9, wherein the data store comprises a plurality of sets of hierarchical tags that describe parameters of the source environment at different times, each set of hierarchical tags is created in view of a policy that schedules creation of a new snapshot to capture changes in the source environment.

15. A non-transitory computer readable storage medium comprising instructions that, when executed by a processing device, cause the processing device to:
receive a request to recreate an application from a particular point in time;
determine, by the processing device, a set of hierarchical tags in a data store of hierarchical tags, the set of hierarchical tags describes a computing environment that hosts the application from the particular point in time;
copy, from the data store, a snapshot associated with a source data tag of the set of hierarchical tags; and
recreate the computing environment hosting the application from the particular point in time in a replication environment using the set of hierarchical tags and the snapshot.

16. The non-transitory computer readable storage medium of claim 15, wherein the set of hierarchical tags comprises at least an application tag to describe settings associated with the application or a configuration tag to describe configuration data of the computing environment.

17. The non-transitory computer readable storage medium of claim 15, wherein to recreate the computing environment, the processing device is further to deploy the application from the particular point in time in view of a state tag that describes runtime memory states and runtime network connection states of the computing environment hosting the application from the particular point in time.

18. The non-transitory computer readable storage medium of claim 15, wherein the application is a containerized application.

19. The non-transitory computer readable storage medium of claim 15, wherein the processing device is further to:
deploy the application from the particular point in time in view of a state tag; and
modify the copied snapshot in a replication data store.

20. The non-transitory computer readable storage medium of claim 15, wherein the data store comprises a hierarchical table, and wherein to the processing device is further to determine a recent change to a tag the data store in view of the request.

* * * * *